United States Patent
Williams et al.

[11] 4,085,367
[45] Apr. 18, 1978

[54] METHOD AND DETECTION OF PHASE AND FREQUENCY MODULATION

[75] Inventors: John Chamberlin Williams, Moorestown; William Braxton Sisco, Voorhees, both of N.J.

[73] Assignee: RCA Corporation, New York, N.Y.

[21] Appl. No.: 749,413

[22] Filed: Dec. 10, 1976

[51] Int. Cl.² .............................................. H04B 17/00
[52] U.S. Cl. ........................................ 325/67; 325/363; 324/77 B; 324/83 A
[58] Field of Search ................ 325/133, 134, 67, 363, 325/332, 333; 324/83 R, 83 A, 77 R, 77 B, 77 D

[56] References Cited

U.S. PATENT DOCUMENTS

| | | | |
|---|---|---|---|
| 3,154,741 | 10/1964 | Attwood | 325/363 |
| 3,526,842 | 9/1970 | Andrew | 324/77 R |
| 3,621,388 | 11/1971 | Davis | 324/77 B |
| 3,808,528 | 4/1974 | Nugent et al. | 324/77 R |
| 3,913,013 | 10/1975 | Barley et al. | 324/77 B |
| 3,992,670 | 11/1976 | Gittins et al. | 325/363 |

*Primary Examiner*—Robert L. Griffin
*Assistant Examiner*—Marc E. Bookbinder
*Attorney, Agent, or Firm*—H. Christoffersen; Joseph D. Lazar

[57] ABSTRACT

There is disclosed a measurement and recording system having means for simultaneously displaying and recording the spectrum of a signal and the instantaneous phase of selected spectral components of the signal with respect to a local reference signal. Means are disclosed for displaying and recording the signal element lengths as a function of time. The system and method enables an analysis of digitally modulated signals of unknown modulation.

The system also provides a means to detect faults in the system equipment that may be generating signals having undesirable variations in phase, frequency, or amplitude.

7 Claims, 8 Drawing Figures

METHOD AND DETECTION OF PHASE AND FREQUENCY MODULATION

The invention herein described was made in the course of contract F30602-74-C-0216 with the Department of the Air Force.

BACKGROUND OF THE INVENTION

Field of the Invention

Under favorable conditions of radio propagation where a signal does not undergo prohibitive distortions, using modulation superimposed on normally modulated signals is known. These favorable transmission conditions include high frequency line-of-sight, medium frequency groundwave, and low and very low frequency skywave. Phase and frequency modulations superimposed on normal modulations such as frequency shift keying (FSK), phase shift keying (PSK), on-off keying (OOK), other types of binary, M-ary and CW signals may be used: a. to increase the communication capacity; b. to conceal a message; c. to synchronize bits and characters.

In addition, time modulation could be superimposed, as in a variation of the element lengths used in the OOK signalling. Time modulation consists of varying the length of a baud or a bit. Such time modulation could be superimposed on any other modulation to increase the bit rate or conceal the time modulation by changing the length of the bit by a slight amount - i.e., several different symbols would be generated by several different changes in bit length.

U.S. Pat. No. 2,692,330 issued on Oct. 19, 1954, to L. R. Kahn discloses a noise reduction system wherein phase modulation (PM) signals are superimposed on frequency shift keyed (FSK) signals. See also U.S. Pat. No. 3,916,313 issued Oct. 28, 1975, to R. B. Lowry, disclosing a PSK/FSK spread spectrum modulation/-demodulation system.

It can be shown that the a particular complex signal spectrum can be generated by any one of a plurality of modulation types. However, the manner of detecting, demodulating, or analyzing such a complex signal spectrum without a priori knowledge of the modulation has heretofore not been known.

In general, certain known systems are used to detect the usual FSK, PSK, OOK, other types of binary and CW signals but they are not capable of recognizing the presence of additional modulation, let along decode it. In particular, if the frequency or phase modulation is imposed at a very slow rate with a small total deviation, the modulation will be undetectable in the existing systems. Depending upon the superimposed modulation used, it might be necessary to detect phase changes as small as one degree and frequency changes as low as 0.1 Hz. or perhaps even smaller in the presence of the normal frequency, phase, ON-OFF modulation and apparent CW signals.

SUMMARY OF THE INVENTION

The present invention provides for a measurement and recording system providing means for simultaneously displaying and recording the spectrum of a signal and the instantaneous phase of selected spectral components of the signal with respect to a local reference signal. The system provides; as well, a means for displaying and recording the signal element lengths as a function of time. The means employed enables detection and analysis of complex modulations or signatures of equipment whereby faults may be easily identifiable.

DETAILED DESCRIPTION OF A PREFERRED EMBODIMENT

To demonstrate the use of the invention for signal analysis, a special detection, analysis and recording system embodying the principles of the invention will be described. The system may operate at very low radio frequencies using available commercial equipment components, but the principle of operation is equally applicable at frequencies that are higher (or lower) from 100 MHz to around 1 Hz. The block diagram of the system is shown in FIG. 2 while a simplified diagram of a system illustrating the principles of the invention is shown in FIG. 1.

Figure 1:
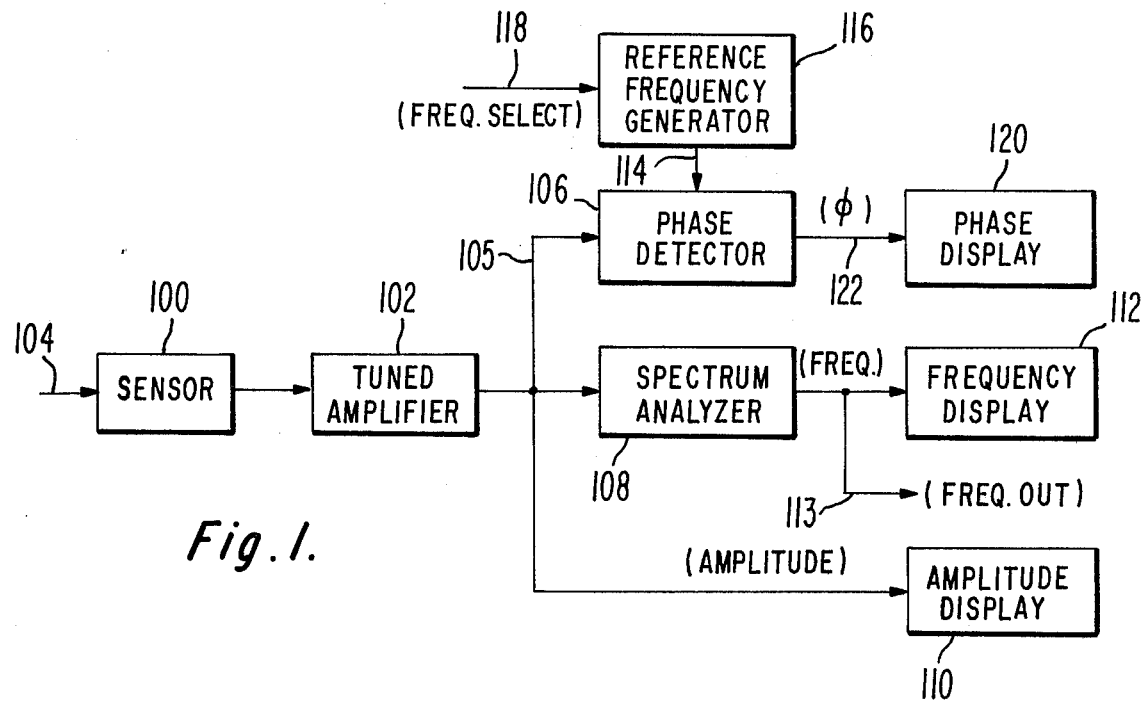
FIG. 1 is a block diagram of a system illustrating the principle of the invention.
Figure 2:
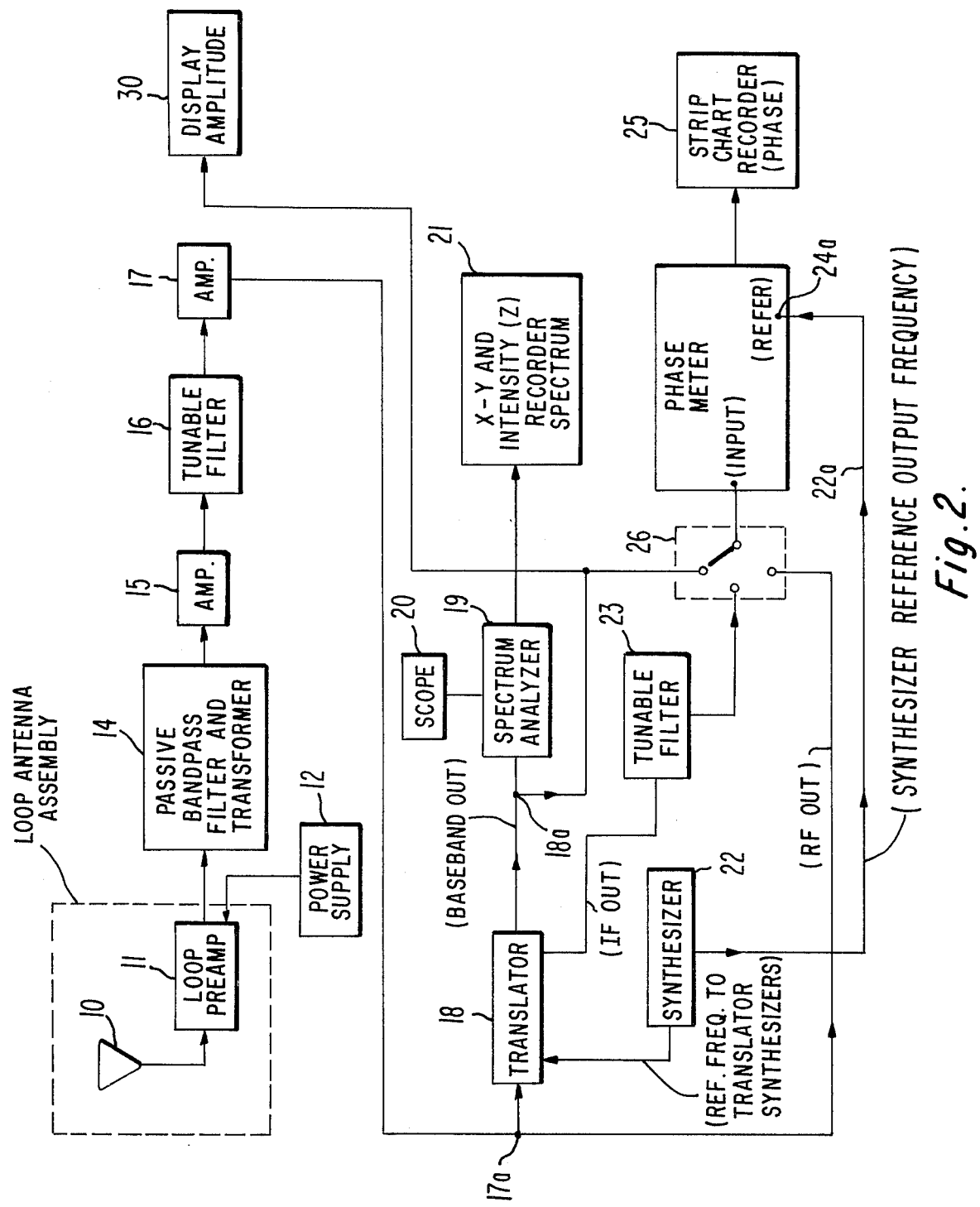
FIG. 2 is a block diagram of a system embodying the principles of the invention.

Referring now to FIG. 1 illustrating a system embodying the principles of the invention, sensor 100 provides the input signals to the system that are passed through a tuned amplifier 102. Sensor 100 may be in the form of an antenna, a hydrophone, or a magnetic pickup and the signal 104 applied to it is typically a digitally modulated signal of unknown modulation type. The amplified signal after being filtered and processed through amplifier 102 is applied to a phase detector 106, a spectrum analyzer 108 and an amplitude display such as a strip chart 110. Signals representing the frequencies detected by analyzer 108 are applied to a frequency display 112 also suitably a strip chart. Phase detector 106 is response to the signal from the tuned amplifier 102 will provide a signal representing the phase difference between the instantaneous frequency of the signal that is received over path 105 and the frequency of the signal received over path 114 provided by a precise reference frequency signal generator 116. The frequency of the reference signal is selected in accordance with a suitable command or control signal received over path 118. The analyzer 108 may be arranged to provide a control signal as the input 118 via path 113 to reference generator 116 whereby each frequency signal upon detection controls the generator 116. Phase display 120, suitably a strip chart, provides a visual display of the phase signal that is passed from phase detector over path 122. Additional detectors 106 and reference generator 116 may be provided to suit the system conditions. Thus a four frequency system would use four detectors 106, displays 120, and generators 116. Furthermore, if desired, it is apparent that the frequency display 112 (which, may, in the alternative be an X-Y and intensity recorder) may be used to provide a record of the output of phase detector 106 by providing a suitable switch, not shown, to connect such a display 112 to either the phase detector 106 or the spectrum analyzer 108.

In operation, a digitally modulated signal of unknown modulation received by sensor 100 is amplified and applied to spectrum analyzer 108. Analyzer 108 detects each frequency component of the modulated signal and displays each such component on strip chart 112 as a discrete frequency signal. Each frequency that is displayed on strip chart 112 is selectively applied suitably as by a manual selection via path 118 to control the frequency of the reference frequency generator 116 to provide a reference signal over path 114 whose frequency is that desired. The reference signal is applied via path 114 to phase detector 106. In response to the modulated signal received via sensor 100, phase detector 106 will determine any relative phase differences that occur in that received signal as compared to the reference frequency from frequency generator 116. This phase difference is applied to the strip chart of the phase display 120.

This procedure is repeated for each of the frequencies selected from those displayed by frequency display 112. In this way, the received modulated signal of unknown modulation is analyzed for both its frequency components and the variations in their phase relative to local references having like frequencies. Furthermore, strip chart 110, indicating amplitude displays, will aid in analyzing the type of modulation that is being received. Thus, display 110 will be able to identify whether the signal is FSK, OOK, or, indeed, time duration modulation. By means of the display information for the frequency display chart 112 and the phase display chart 120, the received modulated signal is analyzed and any modulations that are included in the signal can be detected and identified. Furthermore, the signature of a given equipment can be analyzed to indicate drifts in phase or frequency or amplitude by analzying the wave shapes of the displays, as will be described in more detail with reference to the description of the system of FIG. 2.

Referring now to FIG. 2 a signal of unknown modulation is picked up by a loop antenna 10, amplified by loop preamplifier 11, provided with power from supply 12 and passed through a filter 14 that removes all but inband frequencies. After further amplification by amplifier 15, the desired station is acquired by passing the signals through a tunable filter 16 and amplifier 17. From this point (17a) the signal is fed to a translator 18 which translates the signal down to a desired baseband (essentially the modulation bandwidth with a slight offset from zero frequency). From this point (18a) the signal is fed to a spectrum analyzer (19) and an X, Y, and Z (intensity) recorder 21 which is capable of displaying small variations in frequency. The use of recorder 21 with a time related display of the spectrum (Z-intensity) allows in conjunction with the phase recorder (25) for discriminating between phase and frequency modulation, since the phase record will display such characteristics, as for example, phase continuity as will be described further below. An amplitude display 30 is also provided similar to display 120.

Figure 3:
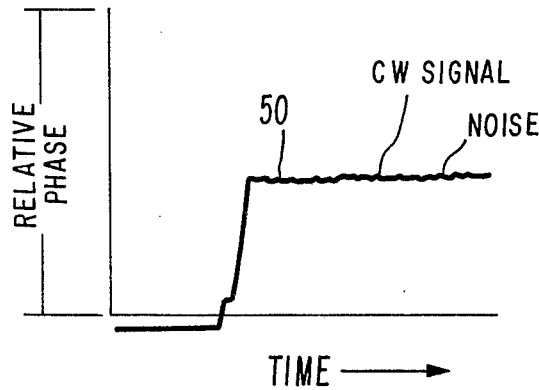
FIG. 3 is a phase recording (relative phase-signal and standard (synthesizer)) of a CW signal.
Figure 4:
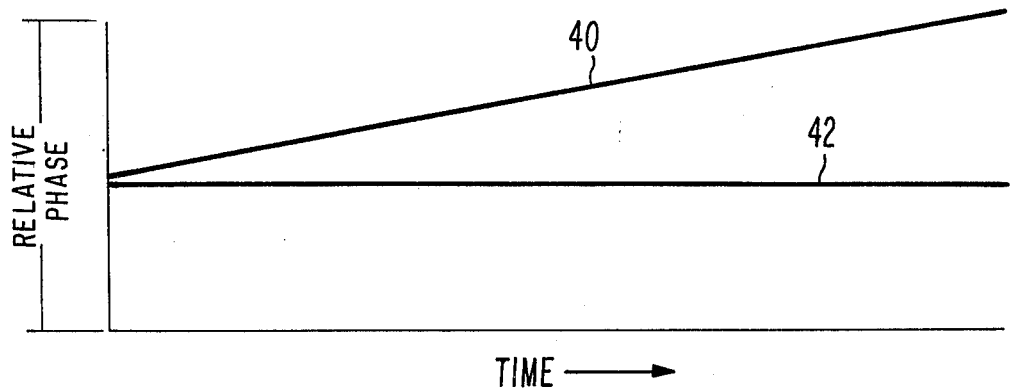
FIG. 4 is a graph showing a CW signal with slow phase or frequency modulation.
Figure 5:
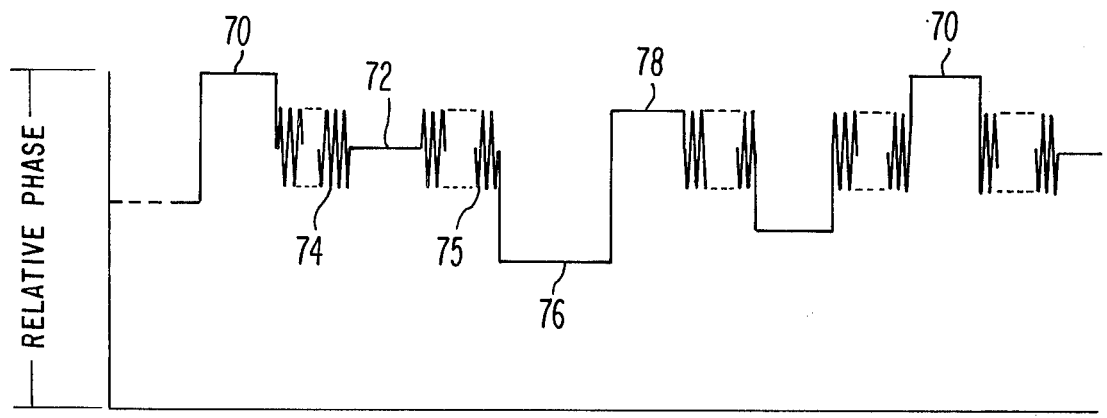
FIG. 5 is a phase recording of an FSK signal as a function of time showing the detection of a synthesized two baud FSK signal with a M-ary PSK superimposed modulation, showing the phase change of the synchronous bit.

Returning again to FIG. 2 at the point 17a where signals enter the translator 18, the input signals, the IF signals from the translator 18, and baseband signals from the translator, are fed to a switch 26 on the input of a phase meter 24. A synthesizer signal from synthesizer 22 equal to either the signal, the IF, or the baseband frequency is fed to the reference terminal 24A of the phasemeter 24 via path 22a and the phase detector output to a strip chart (phase) recorder 25. To maintain the frequency stability of the translator IF and baseband outputs, the internal translator synthesizers are driven by a suitable signal from the synthesizer 22. FIG. 3 is a strip chart recording of relative phase (synthesizer and signal) of a CW signal 50 without modulation. In FIG. 4, a synthesized slow phase modulation 40 is imposed on a CW signal 42. The relative phase of one frequency of a typical two bit per second FSK signal as recorded is shown in FIG. 5. The phase of all synchronized bits would have a value such as signal 70 in the absence of superimposed PSK. Superimposed on this FSK signal is an M-ary PSK signal which modifies the phase seen on the synchronized bits. Note the variation of the phase of the synchronized FSK bit from reference bit 70 to bit 72, etc., i.e., M-ary PSK.

It will be noted that the portion 70 of the strip chart display (FIG. 5) shows the reference frequency in synchronization with one frequency of the two frequency FSK signals that are received. Portion 74 shows the reference frequency asynchronous with the other FSK frequency. Portion 72 shows that the frequency of the incoming signal is the same as the reference frequency signal (as generated by reference frequency generator 116, FIG. 1 or reference frequency generator 22 of FIG. 2) but of a different phase. Portion 75 is the same as the portion 74 showing that the reference frequency is again asynchronous with the other FSK frequency. Portion 76 is the same frequency as the frequency of portion 72 but with still another phase difference indicating that the incoming signal has been further modulated with another phase signal. It will be appreciated that in these phase delays, a phase shift of 360° is the equivalent as the original signal (70) without a phase shift.

Figure 6:
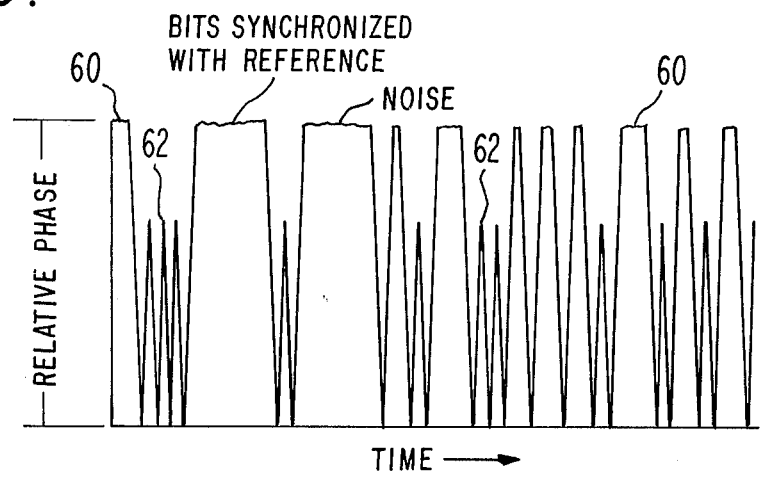
FIG. 6 is a chart of an FSK signal showing the phase of the synchronous bit of the FSK signal as a function of time, showing the phase change from bit to bit.

In FIG. 6 the relative phase of an FSK signal is shown. Portions 60 show that the frequency of one of the FSK signals is in phase with reference signal 22a while portions 62 show the presence of the FSK signal of the other frequency. The transition from the synchronous bit (60) to the asynchronous bits (62) shows that the modulation is phase continuous.

Figure 7:
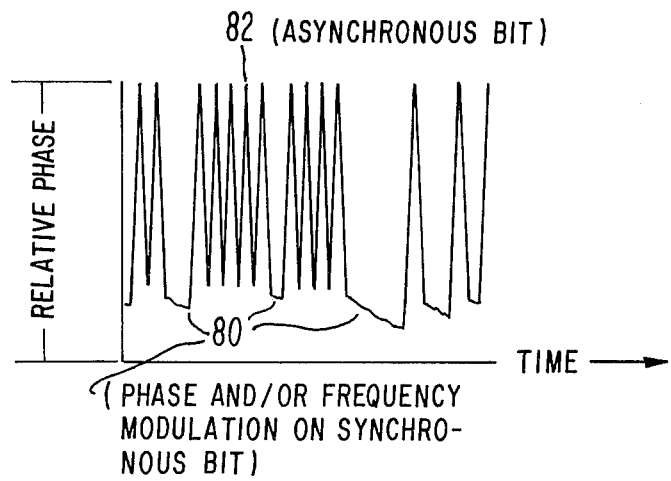
FIG. 7 is a chart showing an FSK signal with phase and/or frequency modulation superimposed on a synchronous bit which shows the signature of faulty equipment.

FIG. 7 illustrates by the waveforms shown the capability of the system to detect either a superimposed phase or frequency modulation signal on one frequency of an FSK signal. Phase resolution on the chart from recorder 25 is preferably about one or two degrees. Small frequency changes are also preferably detectable on the strip chart phase recording with accuracies equal to the synthesizer short term stability. By suitably digitizing the output of the phasemeter, 0.1 degree resolution can be achieved. Since the chart is timed, baud rates are available together with element lengths, and actual messages in binary form can be detected. Although all of the information - phase, frequency, bit rate, magnitude and message (binary form) - has been recorded, in analog form, this data can be digitized and then processed, analyzed, displayed and stored by a computer in any known manner. Resolution and accuracy should increase by a factor of ten with suitable digitization. The synchronized bits of the wave plot in FIG. 7 are indicated by portion 80 while the asynchronous bits are indicated by portion 82. Note that the bits 80 have a phase slope such as might be introduced by nonlinear equipment components of the signal source indicating thereby faulty components.

Figure 8:
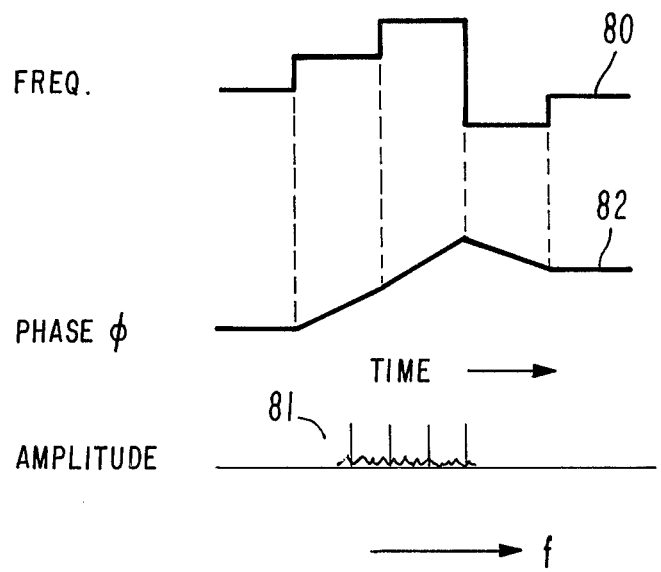
FIG. 8 are waveforms helpful in understanding the operation of the embodiment.
Figure 8:
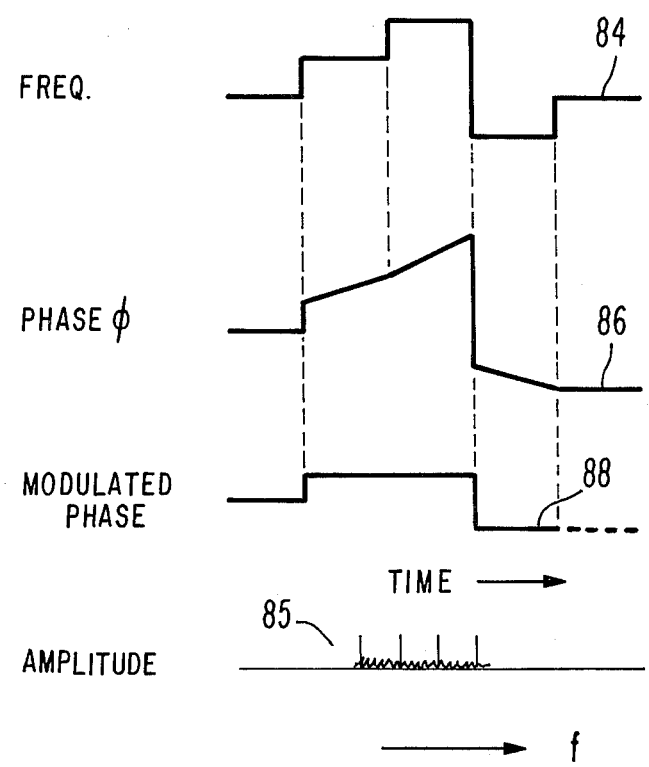

FIG. 8 illustrates by waveform, several modulation schemes that are identified by the conjunctive use of phase recorder 25 and frequency recorder 21. Wave 80 is a M-level FSK which is displayed as 81 by recorder 21 and wave 82 is the phase output of recorder 25 when the phase detector is referenced to frequency 83. These two waves are derived from an M-level FSK signal that is phase continuous.

An M-level FSK signal 84 with superimposed phase modulation 88 (phase discontinuities) is represented by waves 85 and 86 displayed by charts 21 and 25, respectively. Without the conjoint use of the frequency and phase detection, it would be impossible to discern such a superimposed modulation since the frequency spectra within and without the superimposed modulation are substantially identical.

It will now be appreciated that the described system is capable of detecting and recording minute superimposed frequency and phase modulation on otherwise normal FSK, PSK, MSK, OOK and other binary modulated and CW radiated signals. Results from laboratory-generated signals indicate that superimposed phase and frequency variations (modulation) as small as one degree and 0.1 Hz. or less can be detected in analog form. Digitizing and computer processing the results should increase the resolution by a factor of ten as indicated above.

Although the system is not optimally designed for the detection and decoding (in M-ary form) of any particular type of modulation, it can, in effect, perform these functions for all types of modulation within the time constant, frequency, and phase resolution limitations of the equipment.

In addition to the modulation and detecting capabilities, the entire system functions as an extremely sensitive variable-bandwidth receiver. This flexibility is accomplished primarily with the sharp tunable filters (23) of the translator and the resolution and integrating properties of the spectrum analyzer (19). Signals can be observed in real time on the spectrum analyzer scope 20 over a wide range of bandwidths and their frequency and phase characteristics recorded. By using fine frequency resolution along with the integrating properties of the spectrum analyzer, signals having extremely poor signal-to-noise ratios (S/N) can be detected.

It will be appreciated that in accordance with the present invention, not only can single level and two level modulations be detected and analyzed but that a fault in the equipment can be detected since even the slightest changes in phase, frequency or amplitude will be displayed by the detecting process.

What is claimed is:

1. A method of determining the frequency and modulation of a signal of unknown frequency and digital modulation comprising the steps of:
   a. analyzing the frequency components of said digitally modulated signal into frequency component signals;
   b. detecting the phase variations of each of said frequency components of said signal by comparing each of said frequency component signals with a reference signal having a frequency that is the same frequency, respectively, of each component signal;
   c. displaying phase variations that exist;
   d. displaying said frequency components, and
   e. examining said frequency components display in conjunction with said phase display to determine the modulation of said unknown frequency signal.

2. The method according to claim 1 wherein said unknown frequency signal is derived from equipment that may provide a characteristic signature to said signal and, further comprising the step of analyzing the respective phase and frequency displays to identify changes in the phase of a frequency component indicating thereby a characteristic in the equipment providing said unknown frequency signal.

3. Apparatus for analyzing the unknown modulation of a complex digitally modulated electromagnetic signal of unknown frequency;
   a. means for receiving said modulated signal;
   b. spectrum analyzer means responsive to said modulated signal for analyzing frequency components and providing signals manifesting each of said frequency components;
   c. frequency synthesizer means for providing a reference signal of a selected frequency;
   d. means for selecting the frequency of said synthesizer means to correspond to the frequency of each frequency component manifested by said spectrum analyzer means;
   e. phase detection means responsive to said modulated signal and said reference signal for providing a signal manifesting phase differences between said reference signal and said modulated signal; and
   f. first means for displaying said frequency component signals and second means for displaying said phase difference signal, both display means conjunctively enabling a determination of the modulation of said complex signal.

4. Apparatus according to claim 3 further including an X-Y recorder responsive to said spectrum analyzer signals or to phase detection means signal for displaying said frequency spectrum or said phase difference signal, respectively, in the frequency spectrum.

5. Apparatus according to claim 3 comprising a Z recorder responsive to said spectrum analyzer to record variations in spectrum as a function of time.

6. Apparatus according to claim 4 further comprising amplitude display means responsive to said receiving means for displaying variations in amplitude of said signal.

7. Apparatus according to claim 4 further including cathode ray oscilloscope means coupled to the output of said spectrum analyzer to display spectrum, phase and time-domain magnitude of said modulated received signal as functions of time.

* * * * *